United States Patent [19]

Takahashi et al.

[11] Patent Number: 4,573,698
[45] Date of Patent: Mar. 4, 1986

[54] MOTORCYCLE STEERING MECHANISM

[75] Inventors: Hirotake Takahashi, Sayama; Kenji Nishikawa, Tokorazawa, both of Japan

[73] Assignee: Honda Giken Kogyo Kabushiki Kaisha, Tokyo, Japan

[21] Appl. No.: 541,938

[22] Filed: Oct. 14, 1983

[30] Foreign Application Priority Data

Oct. 14, 1982 [JP] Japan .................................. 57-180502
Dec. 10, 1982 [JP] Japan .................................. 57-215378

[51] Int. Cl.$^4$ ............................................. B62K 21/06
[52] U.S. Cl. ............................. 280/279; 180/219
[58] Field of Search .................. 280/279, 280, 276; 180/219; 384/226, 247, 147

[56] References Cited

U.S. PATENT DOCUMENTS 3,306,684  2/1967  Klein, Jr. .......................... 280/279
4,445,703  5/1984  Tange .................................. 280/279

Primary Examiner—Joseph F. Peters, Jr.
Assistant Examiner—Donn McGiehan
Attorney, Agent, or Firm—Pollock, Vande Sande & Priddy

[57] ABSTRACT

A steering mechanism for motorcycles comprising upper and lower angular ball bearings having a swing angle of at least 50% and retained out of contact with one another by a pressure fitted retainer element. Friction rings are provided at the upper and lower ends of the steering column to permit reduction of pressure on the ball bearings, and the pressure on the upper and lower ball bearings is equalized by selective tightening of a nut mechanism attached to the upper end of the steering column.

8 Claims, 25 Drawing Figures

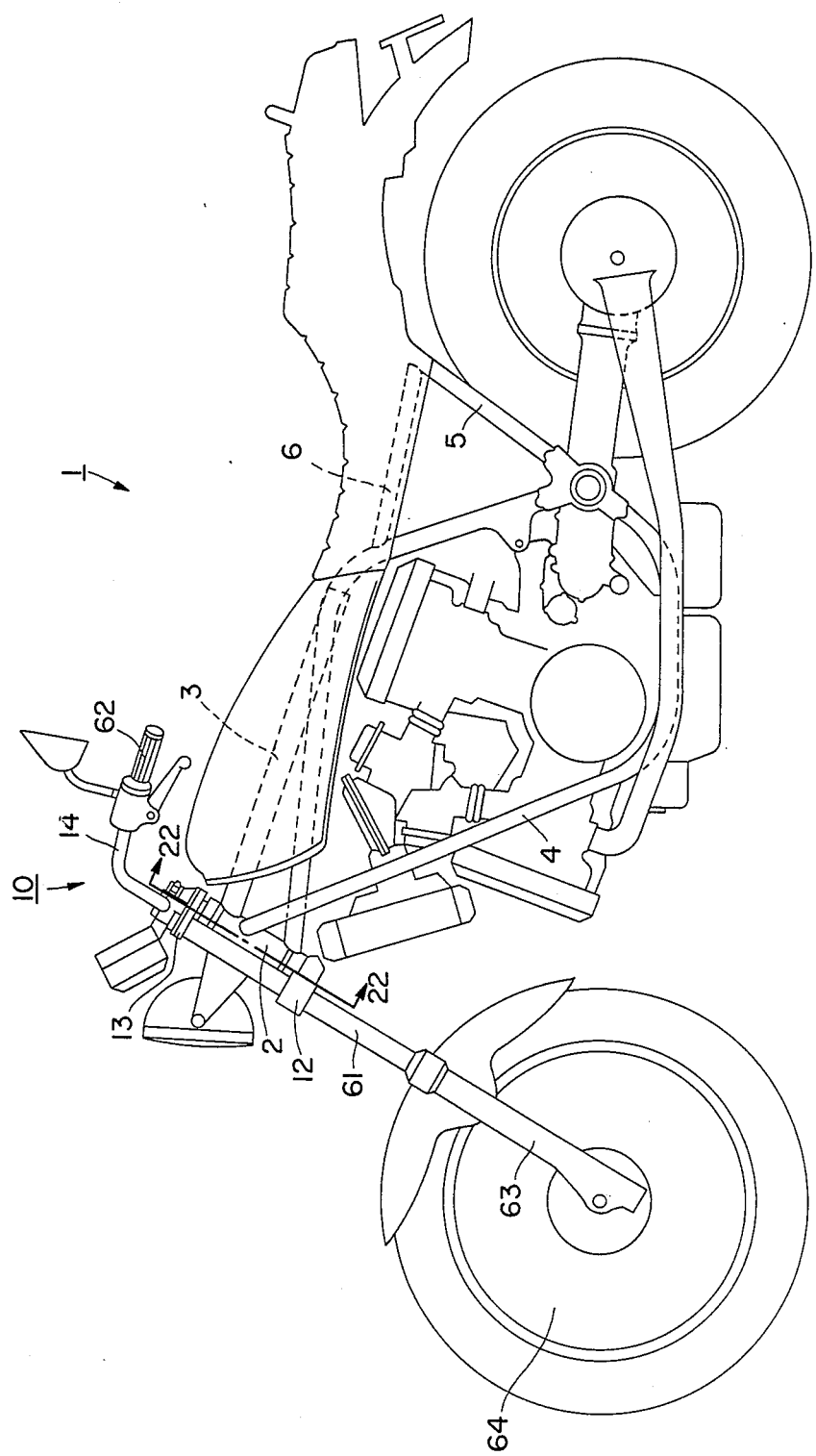

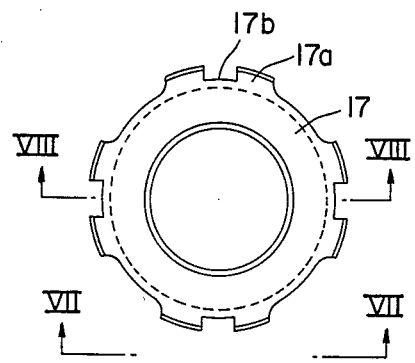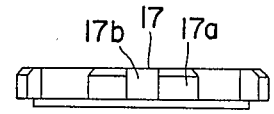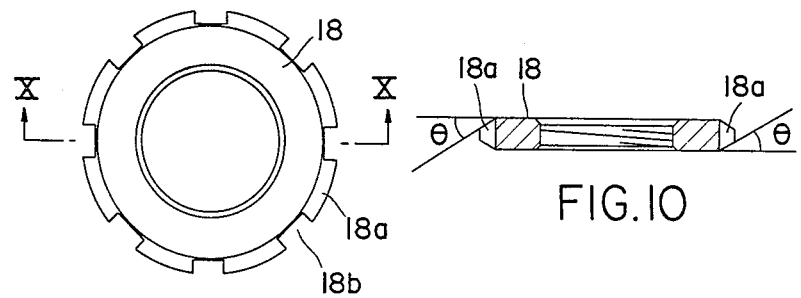

FIG. 23
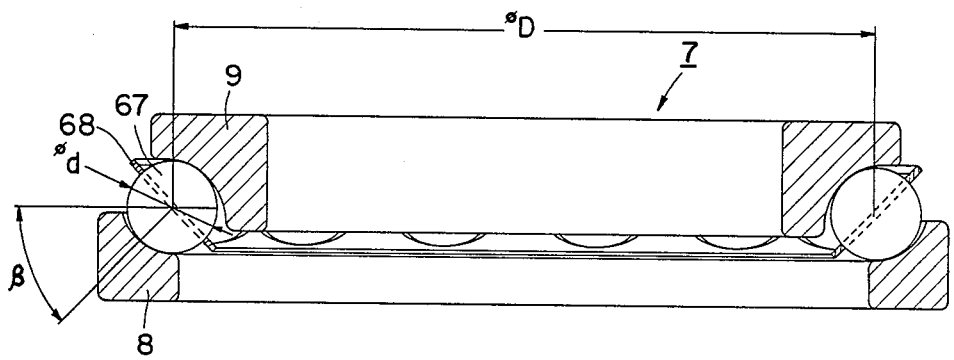
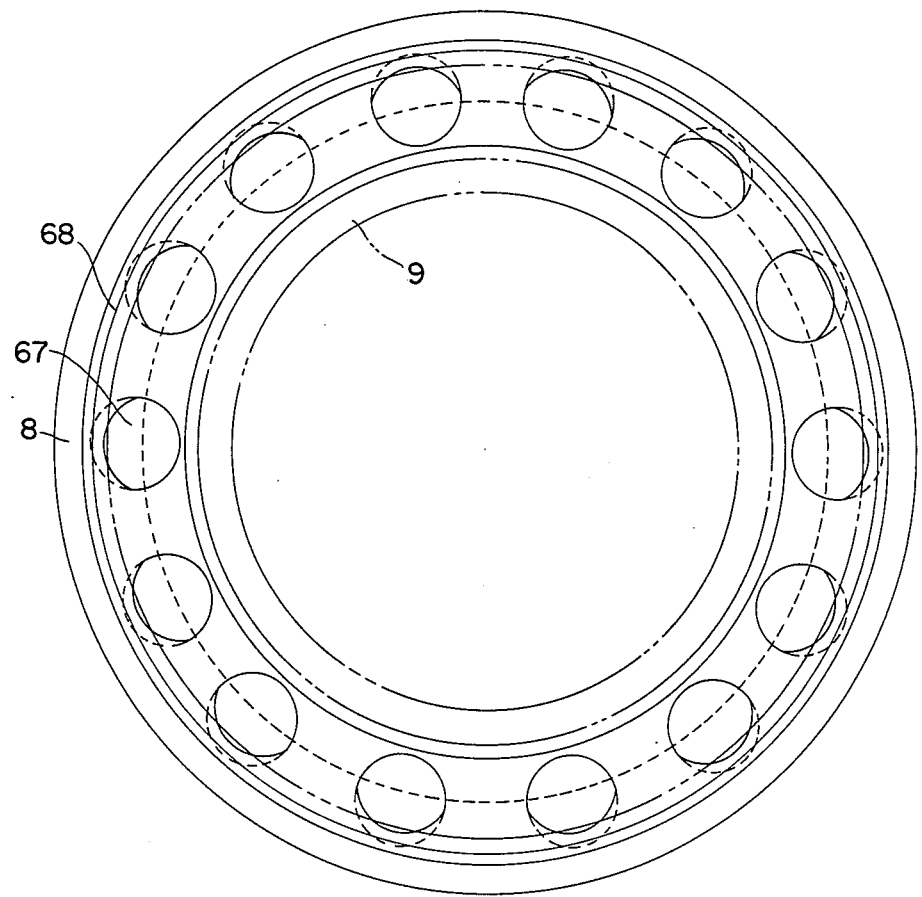
FIG. 24

MOTORCYCLE STEERING MECHANISM

FIELD OF THE INVENTION

The present invention relates to a steering device for motorcycles, and in particular, for assuring proper steering quality.

BACKGROUND OF THE INVENTION

Bearings used for the steering columns of motorcycles are subject to bi-directional load, i.e., in both the radial direction and the axial (shaft) direction. Accordingly, angular contact ball or roller bearings are generally used. This gives rise to several problems.

The magnitude of the frictional resistance of the steering column, i.e., its turning friction torque, must be held within predetermined limits. It is possible to adjust this torque by tightening the nut on the steering column at the time the latter is attached to the head pipe. Angular contact ball bearings provide a wider adjustment range for the shaft tightening force than conical roller bearings, and hence facilitate higher loads.

However, the ball or roller bearings used in prior art steering mechanisms allowed only a rather small angle of swing.

OBJECT OF THE INVENTION

The present invention has as its object a handle bar steering device which can turn over a large angle, and which provides steering "feel" to the handle bars. At the same time, the present invention expands the possible adjustment range for tightening of the steering column, and reduces the load on the bearings. In general terms, this involves the provision of friction material between the head pipe and the steering column of the motorcycle.

BRIEF DESCRIPTION OF THE DRAWINGS

In order that the invention may be more clearly understood, reference will now be made to the accompanying drawings, wherein several embodiments of the invention are shown for purposes of illustration, and wherein:

FIG. 2 is a side view of a motorcycle incorporating one embodiment of the steering device according to the invention;

FIG. 6 shows a plan view of the bearing tightening nut;

FIG. 7 is a view along line VII—VII of FIG. 6;

FIG. 8 shows a cross section along line VIII—VIII of FIG. 6;

FIG. 9 is a plan view of the nut which supports the top bridge;

FIG. 10 shows a cross section along the line X—X of FIG. 9;

FIG. 23 is a detail view of a portion of FIG. 22;

FIG. 24 is a plan view of the bearing structure when the inner ring has been removed.

DESCRIPTION OF PREFERRED EMBODIMENT

Figure 1:
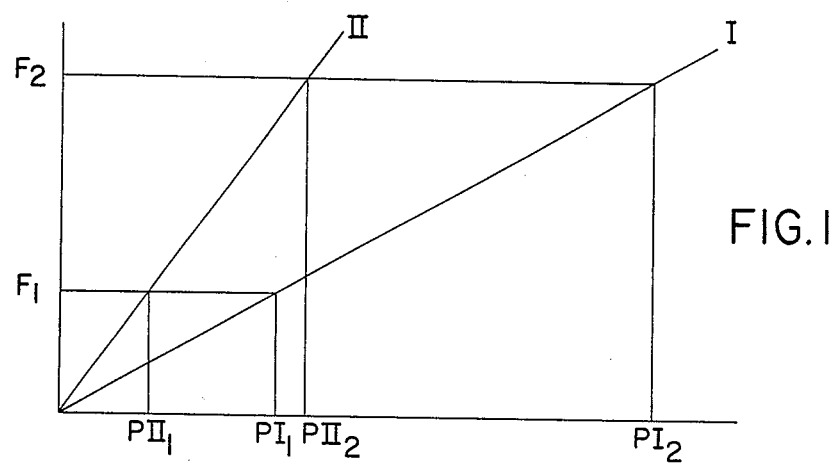
FIG. 1 is a graph which shows the relationships between the axial pressure by tightening the nuts on the bearings, and the friction torque.

As will appear from FIG. 1, a axial pressure P (kg) is applied by tightening the steering system nut, and the relationship between this and the turning friction torque F (kg. cm) around the steering column is shown. Line I relates to the use of angular contact ball bearings, while line II shows the relationship when conical roller bearings are used. If the appropriate range of turning friction torque F is called $F_1$-$F_2$, when angular ball bearings are used, the tightening axial pressure P adjustment range for the steering system nut would be $P\,I_1$-$P\,II_2$. When conical roller bearings are used, it would be $P\,II_1$-$P\,II_2$.

Here, there is a $P\,II_1 < P\,P\,I_1$, $P\,II_2 < P\,I_2$ relationship, so that the angular contact ball bearings have a larger load weight than the conical roller bearings. This indicates that the conical roller bearings have greater durability.

As illustrated in FIGS. 2 through 20, the motorcycle to which the invention is applied comprises frame 1, head pipe 2, main pipe 3, down tube 4, back stay 5 and seat rail 6, all interconnected into one unit. Frame 1 incorporates a steering device 10 which is supported by head pipe 2 so that steering column 11 is free to turn. A unitized lower bridge 12 is attached to the lower end of column 11, and on the upper of the latter nuts 17 and 18 hold the assembly together with upper bridge 13, which is attached to handle bar pipe 14, which carries grips 62. Front wheel 64 is attached to front fork 61 along with a suspension unit 63.

Steering column 11 is supported atop head pipe 2 at its lower edge by angular contact ball bearings 15 and 16. The upper angular ball bearings 16 are affixed to the threaded area 11a of steering column 11 by means of nut 17 (the above-mentioned steering ring system nut), torqued to the required shaft force P. As a result, the same tightening shaft force P is also applied to the lower angular ball bearings 16 (see FIGS. 3 and 4).

Each of angular ball bearings 15 and 16 is composed of inner rings 15a, 16a; outer rings 15b, 16b; balls 15c, 16c; and retainers 15d, 16d. The n number of balls 15c, 16c are held by retainers 15d, 16d in a manner such that they do not contact each other. Therefore, the average diameter of groove contact surface outside diameter $D_1$ for inner rings 15a, 16a and groove contact surface inside diameter $D_2$ for outer rings 15b, 16b may be expressed as:

$$D = \frac{D_1 + D_2}{2}$$

With the diameter of the balls 15c, 16c being d, and the contact angle $\beta$ being the angle between a line joining the contact points between the inside and outside rings 15a, 15b and the right angle to the shaft of the angular ball bearings (which is the same for the angular ball bearings 16), the limiting swing angle $\theta_c$ relationship requires establishing $D_1$, $D_2$, D, d, n and $\beta$ so that the following equation is satisfied:

$$\theta_c = \frac{360}{n}\left(1 + \frac{D + d\cos\beta}{D - d\cos\beta}\right) > \alpha$$

(where $\alpha$ is the amount of possible steering angle when the motorcycle is travelling at 10 km/h or more).

Due to this relationship, an effect is obtained whereby, even if there is friction with the angular ball bearings 15 and 16, the pressure mark formed by one ball on the contact surface of the groove in inner rings 15a, 16a and outer grooves 15b, 16b do not overlap those of the adjacent balls.

Figure 4:
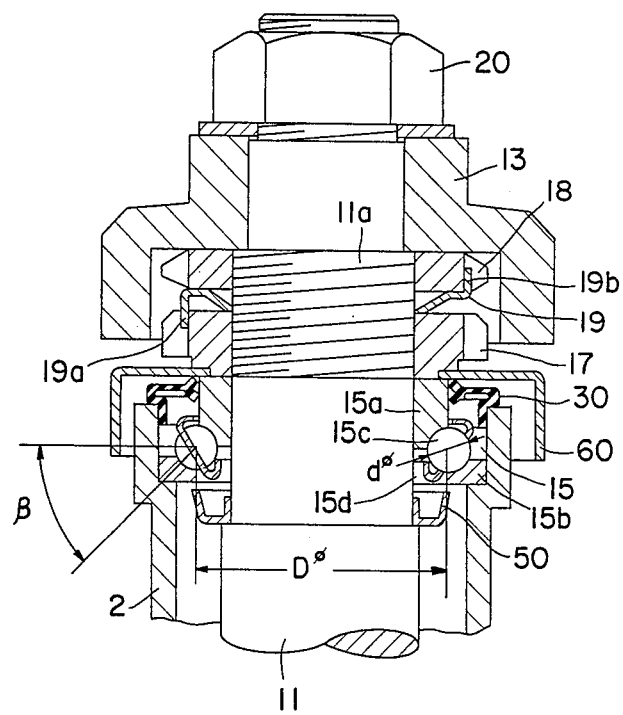
FIGS. 4 and 5 are detail views of the principal areas.

Further, if a slight clearance is left adjacent nut 17, lock washer 19 can be inserted so that nut 18 is threaded upon the threaded part 11a of steering column 11 and upper bridge 13 is affixed to the latter (see FIG. 4).

The shapes of nut 17, 18 and lock washer 19 are shown in FIGS. 6 through 13. Nut 17 has a plurality of stop tabs 17a projecting around its circumference and forming a plurality of stop notches 17b. Nut 18 also has a plurality of stop tabs 18a projecting around its circumference and forming a plurality of stop notches 18b. The stop tabs 18a on the side surface of nut 18 form a bevel angle 0 with respect to the extended surface of the nut face. Lock washer 19 has stop tabs 19a and 19b which are located at 90° intervals around its outside circumference, with the two stop tabs 19a, 19a located at 180° intervals. Both stop tabs 19a are bent at a 90° angle with respect to the surface of the lock washer. Similarly, stop tabs 19b, 19b are located 180° apart, and those tabs are bent in the opposite direction as the 19a tabs to an angle 0 with respect to the surface of the lock washer. When attaching each of these parts 17, 18 and 19 on the steering column 11, after threading nut 17 onto the threaded area 11a, lock washer 19 is placed on top so that the pair of stop tabs 19a engage in the pair of stop notches 17b in nut 17. Next, nut 18 is threaded onto the threaded area 11a. The pair of stop notches 19b on lock washer 19 are then bent upward at angle 0 and the stop tabs 18a on the lower surface of the nut also angle upwards at angle 0 so that nut 18 can be tightened without any obstruction. After affixing nut 18, the pair of stop tabs 18a are bent upward so that they engage in stop notch 18b (see FIG. 4). In this manner, looseness in both nuts 17 and 18 is prevented.

In addition, upper friction ring 30 is pressure fitted into the top end of head pipe 2 in a manner such that its Y-shaped inside diameter cross-section 31 end rim rubs against the inner ring 15a of the angular ball bearings 15 with a predetermined pressure. The Y-shaped cross-sectional area is packed with grease. The upper friction ring 30 is unitized with the bent-cross-sectioned steel ring 32 with rubber layer 33, so that the inside diameter area 31 is formed only from this rubber layer (see FIGS. 4, 14 and 15).

Figure 3:
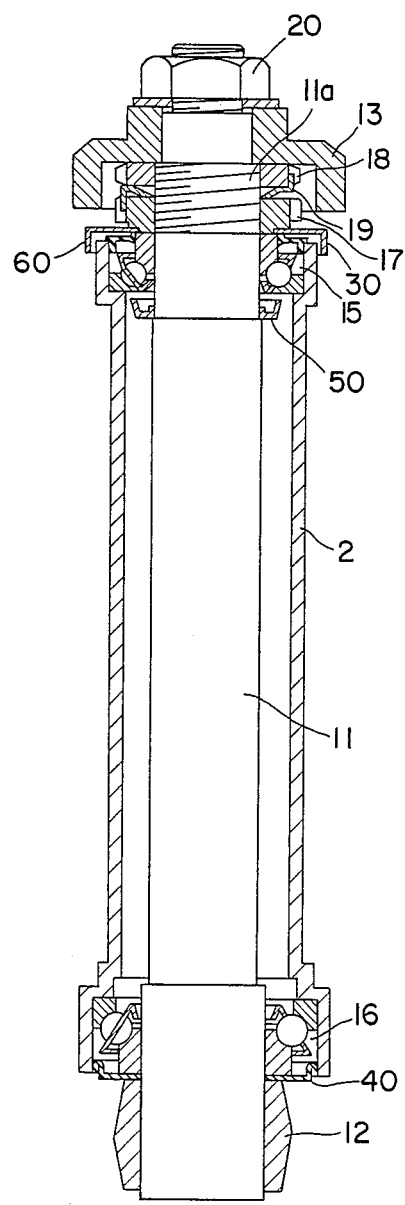
FIG. 3 is a cross sectional view of the principal parts of the steering device.
Figure 5:
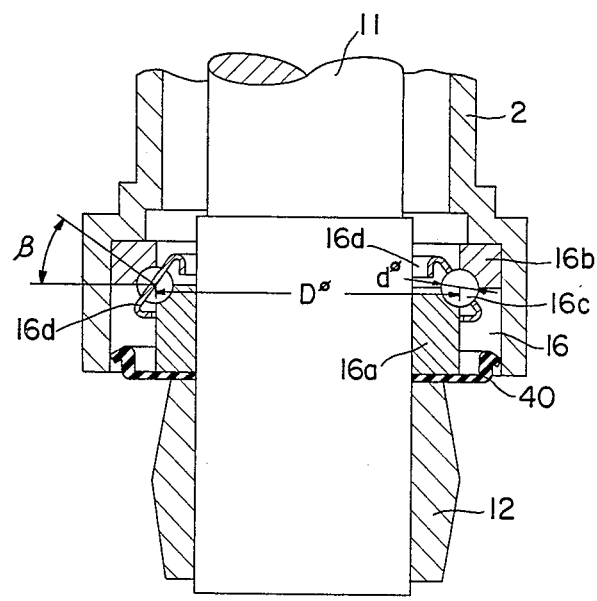
Figure 11:
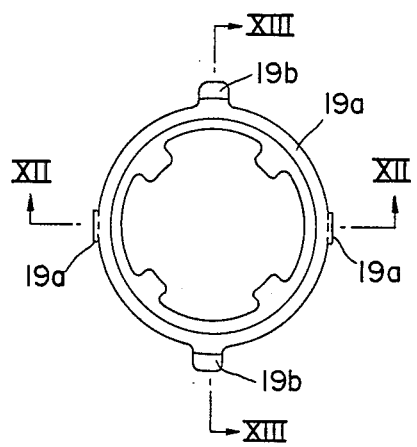
FIG. 11 is a plan view of the lock washer.
Figure 12:
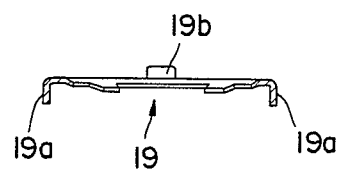
FIG. 12 is a cross sectional view along line XII—XII of FIG. 11.
Figure 13:
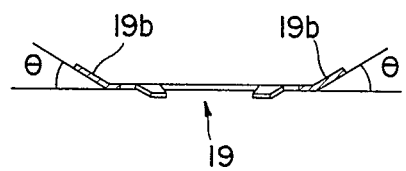
FIG. 13 is a cross sectional view along line XIII—XIII of FIG. 11.
Figure 14:
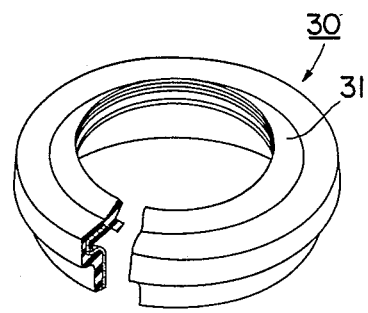
FIG. 14 is a perspective view of the notches in the upper friction ring.
Figure 15:
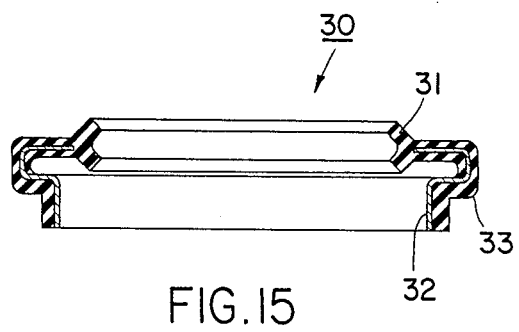
FIG. 15 is a vertical cross sectional view of the upper friction ring.
Figure 16:
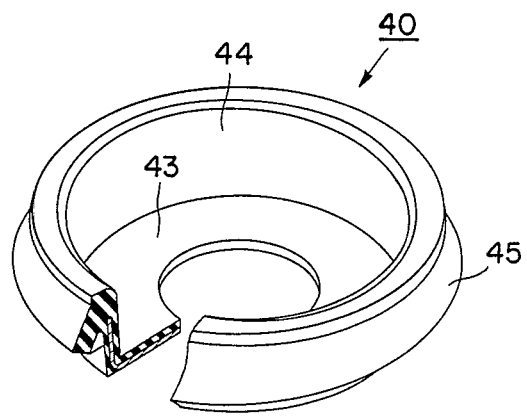
FIG. 16 is a perspective cut-away view of the lower friction ring.
Figure 17:
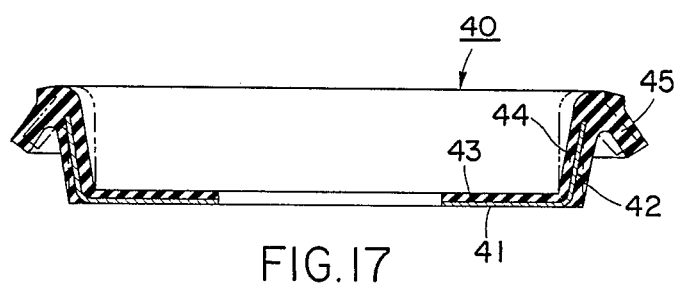
FIG. 17 is a vertical cross sectional view of the lower friction ring.
Figure 18:
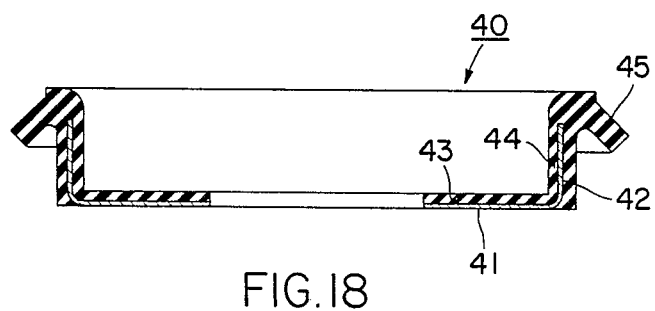
FIG. 18 is a cross sectional view of the lower friction ring in assembled condition.

Between the lower angular ball bearings 16 and the lower bridge 12, there is a lower friction ring 40 pressure fitted onto steering column 11, and its rimmed outer diameter area 45 is fitted at a predetermined pressure against the inside wall surface of the lower end of the head pipe 2 (see FIG. 5). This lower friction ring 40 is unitized with a steel ring 41 of bent cross section with a rubber layer 42, and in the hollow area 44 there is a sloping wall which gradually expands with respect to the base area 43 (see FIGS. 16 and 17). The lower friction ring 40 with the configuration described above is fitted onto steering column 11, and the ridge-shaped outside diameter area 45 is brought into contact with head pipe 2 so that, as shown in FIG. 18, hollow area 44 stands to form a rough right angle with the base part 43. In FIGS. 3 and 4, 50 represents a grease cup inserted onto steering column 11, and 60 is an angular dust cover which is held in place by nut 17.

Figure 19:
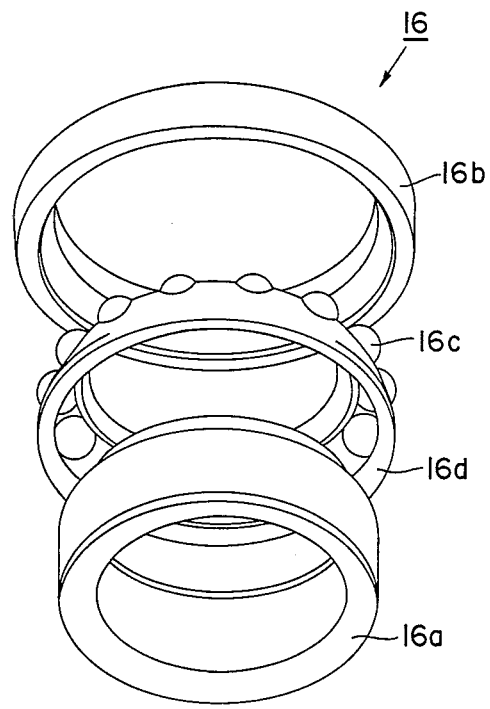
FIG. 19 is an exploded view of the angular contact ball bearings.

Angular ball bearings 15, 16 are both of the three-part type described above. As illustrated in FIG. 19, angular ball bearings 16 are composed of an inner ring 16a, an outer ring 16b, balls 16c and a retainer 16d. A plurality of balls 16c are held in place as a unit by retainer 16d. Accordingly, when assembling the bearings, a pressure fitting tool is used to insert inner ring 16a into steering column 11. Next, the assembly unit made up of balls 16c and retainer 16d is placed on top of inner ring 16a. After that, steering column 11 is inserted into head pipe 2, and outer ring 16b which has been pressure fitted into the lower end of head pipe 2 engages with inner ring 16a, balls 16c and retainer 16d, which have been placed in steering column 11 (see FIG. 5). In this way, because angular ball bearings 16 are of the three-part type, when inner ring 16a is pressure fitted into steering column 11, there is no danger that retainer 16d will be damaged by the pressure fitting tool, and the assembly operation is simplified by the fact that balls 16c are held in place by retainer 16d.

The steering device according to this embodiment is constructed as described above, so that the turning friction F around steering column 11 is applied by tightening nut 17 so that there is equal pressure on angular ball bearings 15 and 16. In addition, the upper and lower friction rings 30, 40 add a friction component (at the inside diameter area 31 and the ridge outside diameter area 45).

Figure 20:
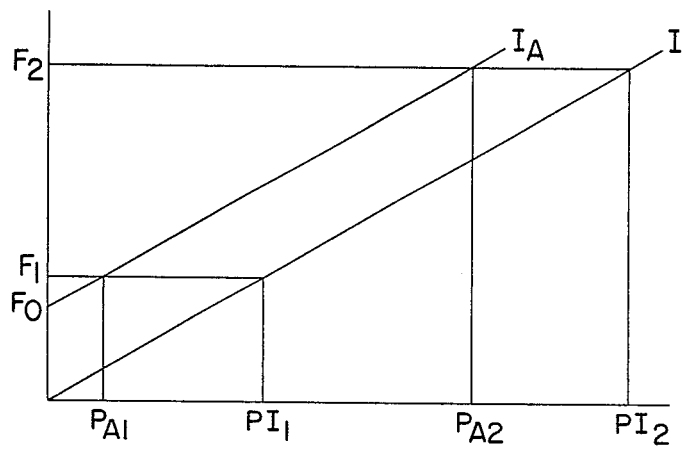
FIG. 20 shows the torque friction relationship to the tightening force P for the angular ball bearings.

When the axial force relationships from tightening nut 17 with respect to the turning friction of steering column 11 attributable to both angular ball bearings 15, 16, shown as straight line I in FIG. 20, and when the upper and lower friction rings 30 and 40 are not used, the specific turning friction torque would be $F_1$-$F_2$, so that the afore-mentioned tightening axial force $P\ I_1$-$P\ I_2$ range must be the range to which the nut is tightened. However, in the illustrated embodiment, there is also a friction torque $F_o$ which is attributable to upper and lower friction rings 30 and 40, and if this $F_o$ is such that $F_o < F_1$, then the relationship between the turning friction torque F around steering column 11 and the axial pressure P from tightening nut 17 is straight line $I_A$ which has a slope equivalent to straight line I. Accordingly, in this embodiment, the required turning friction torque is $F_1 < F_2$, and this can be obtained by using an axial pressure for tightening nut 17 in the range PA$_1$—PA$_2$ (where PA$_1$<PI$_1$, and PA$_2$<PI$_2$).

In this manner, by using an upper and lower friction ring 30, 40, it is possible to reduce the tightening axial pressure P for nut 17 which works to reduce the load on angular ball bearings 15 and 16, thus improving their durability. Moreover, because angular ball bearings are used, there is a wider permissible range for the tightening axial pressure P, and this makes assembly operations easier.

In addition, because additional turning friction is obtained by using a friction material for the upper and lower friction rings 30, 40, and because two such rings are used, the load per ring is lessened, and because the deformation is low too, the durability of upper and lower friction rings 30, 40 is improved. As a further advantage, the upper and lower friction rings double as dust covers.

Figure 21:
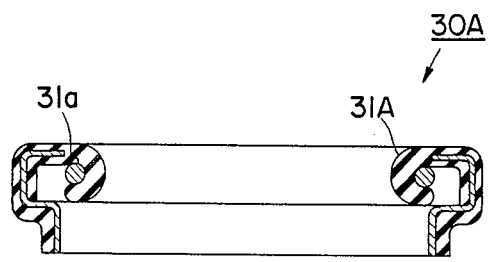
FIG. 21 is a cross-sectional view of the upper friction ring according to a second embodiment of the invention.

In place of the upper friction ring 30, it is also possible to use an upper friction ring 30A, as shown in FIG. 21. On the inside diameter area 31A of said ring 30A, there is an O-shaped ring spring 31a which generates friction as it is tightened.

As will be clear from the foregoing explanation, in the steering device of this invention which uses angular ball bearings, a friction material has been placed between the head pipe and the steering column so that the turning friction torque around the latter arises from the angular ball bearings and the friction material where the load weight on the angular ball bearings is reduced by the amount of friction torque attributable to the friction material. Also, because the permissible adjustment range for the tightening of the nut for the shaft pressure is wider when angular ball bearings are used, the efficiency of assembly operations is improved. Finally, because the friction materials are located on both the upper and lower parts of the head pipe, the load on each is reduced for improved durability.

Figure 22:
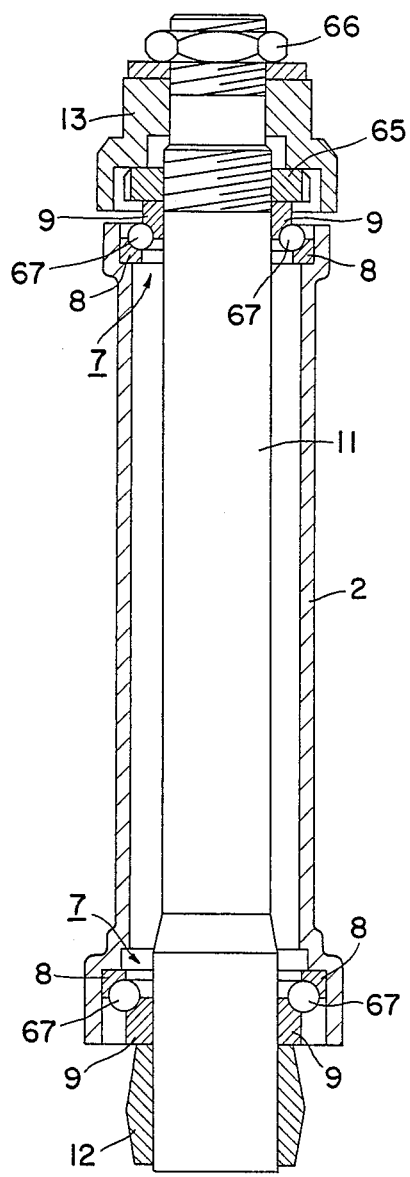
FIG. 22 is a sectional view taken along line 22—22 of FIG. 2.

FIG. 22 shows a further embodiment in which angular ball bearings 7 are contained by an outer ring 8. Steering shaft column 11 is inserted into an inner ring 9 of said bearings 7. At the lower end of shaft 11, bridge 12 is secured by a nut 65 at the top part of shaft 11. Upon tightening nut 65, outer rings 8 of the upper and lower pair of angular bearings 7 are forced into pressure contact with the upper and lower ends of head pipe 2. The inner rings 9 of the upper and lower pair of angular bearings are also forced against shaft 11.

Upper bridge 13, fitted over the top edge of shaft 11, is fixed thereagainst upon tightening of nut 66. Front fork 61, which has previously been unitized with upper bridge 13 and lower bridge 12, is capable of moving from the center of shaft 11 over an angle greater than 50°, for example, a left and right movement range within 40°, and is prevented from swinging further by a stop device (not shown).

Between outer rings 8 and inner rings 9 of the angular ball bearings, fourteen or less balls 67 are held by retainer 68 in an evenly spaced manner, so that they do not contact each other.

If the inside diameter of the contact groove in the outer rings is D$_1$, and the outside diameter of the contact groove in the inside rings 9 is D$_2$, their average diameter is:

$$D = \frac{D_1 + D_2}{2}$$

The outside diameter of the balls 67 is d, the number of balls 67 is n, and, if B is considered the angle of contact, i.e., the angle formed by the line connecting the contact points between balls 67 and inner and outer rings 8, 9 and the right angle from the shaft of bearings 7, then the limiting swing angle $\theta_c$ is:

$$\theta_c = \frac{360}{n}\left(1 + \frac{D + d\cos\beta}{D - d\cos\beta}\right) \quad (1)$$

The said limiting swing angle $\theta_c$, when the motorcycle is running at speeds at 10 km/h or above, is related to the normal handle swing angle $\alpha$ which is possible for steering as follows:

$$\theta_c > \alpha \quad (2)$$

In order that the above-mentioned relationship be established, D$_1$, D$_2$, D, d, n, and $\beta$ are determined. Thus, if D=36 mm, d=7.0 mm, n=14, and $\beta$=45°, then, according to Equation (1), $\theta_c$=59.6°. If the $\alpha$ angle is set at 50°, then Equation (2) can be satisfied.

Also, if D=42 mm, d=7.9 mm, n=14, B=45!, then $o_c$=59.4°, and this too satisfies equation (2).

In the embodiment shown in FIGS. 22 through 24, when grips 19 are swung to the left or right, shaft 11 can be swung left and right ±25° vis-a-vis head pipe 2 via angular ball bearings 7. The center of this swing is the meeting of the centers of head pipe 2 and shaft 11.

In this case, because shaft 11 is swung within the limiting swing angle $\theta_c$ of angular ball bearings 7, even if there is friction with the angular ball bearings, the pressure mark from one of balls 66 on the contact surfaces of outer ring 8 and inner ring 9 is such that it does not overlap at all the pressure mark of an adjacent ball 66. This means that there is no change in the swing resistance of shaft 11, so that handle bar steering operations are smoothly accomplished.

Since balls 66 are held in place by retainer pressure fit during assembly and disassembly operations, they cannot scatter and become lost. This improves the efficiency of the assembly and disassembly operations.

Also, because of retainer 11, the balls can be held within the circular grooves of inner ring 8 and outer ring 9 so that they are spaced evenly. Since one ball does not rub against the adjacent one to cause friction, there is a low swing resistance for shaft 11 because there is no change in the resistance due to contact among the balls.

Figure 25:
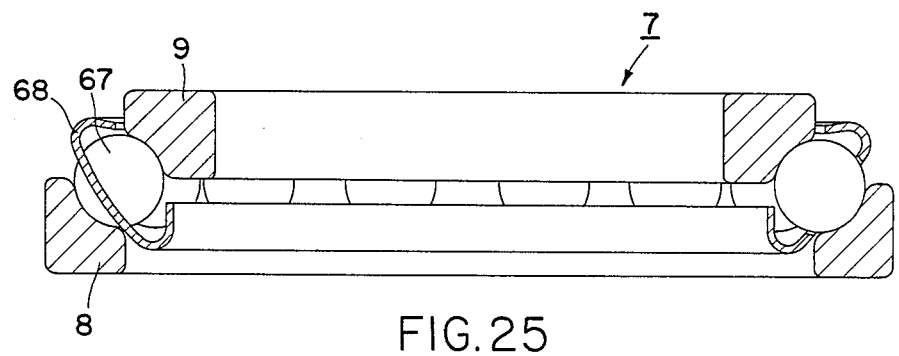
FIG. 25 is a detail view similar to FIG. 23 of the principal parts of a further embodiment.

In the embodiment shown in FIGS. 22 to 24, holes have been formed in the circumferential direction at equidistant spacings along the conical surfaced ring to form the retainer, but, as shown in FIG. 25, in the wide conical surfaced ring, the holes are equidistant in the circular direction, and on the inside circumference of the same ring, there is an upper curve which rides atop outer ring 8. Balls 66 are inserted at the holes in this ring, and after placing the inner ring 9 atop it, the retainer 67 which is curved toward the center may be used as the outer circumferential area of the ring.

With this invention which permits the handlebar swing shaft to turn within 50° with the above-mentioned angular bearings in a motorcycle steering device, the angular bearings are the angular bearings with a retainer attached, so that the limiting swing angle for the ball bearings is greater than the steering angle for the handle swing shaft, so that, when the handle bars are turned to steer over the normal handle steering angle, the ball pressure marks for each of the balls on the contact surfaces of the inner and outer ring grooves are separate from each other and do not overlap. This eliminates the effects from changes in steering resistance due to the ball marks, and makes it possible to maintain a constant steering sensation for the steering column.

What is claimed is:

1. A handle bar steering device for a motorcycle having a steering column with angular bearings to permit swing steering, wherein said bearings comprise angular ball bearings having a swing angle of at least 50°, and being retained out of contact with one another by a retainer element, said device comprising a head pipe and friction means between said head pipe and steering column to provide turning friction resistance for the latter, said device further comprising upper and lower angular ball bearings, said upper ball bearings being affixed to a threaded upper portion of said steering column by means of a first nut, tightening of said first nut producing a substantially equal pressure on both said upper and said lower ball bearings, a second nut being threaded upon said threaded upper portion of said steering column, a lock washer being provided between said first and second nuts, each of said first and second nuts having a plurality of stop tabs projecting around its circumference and forming a plurality of stop notches, and said lock washer having a larger and a smaller pair of opposite stop tabs located at 90° intervals around its circumference, said respective pairs being bent at substantially 90° angles in respectively opposite directions so as to engage the respective stop notches of said first and second nuts.

2. A device according to claim 1, wherein said friction means comprises an upper and lower friction ring respectively fitted into the upper and lower ends of said head pipe and onto said steering column, to permit reduction of axial pressure on said ball bearings.

3. A device according to claim 2, wherein said friction rings serve as dust covers.

4. A device according to claim 2, wherein said upper friction ring is provided with an annular spring at its interior, said spring generating friction as it is tightened.

5. A handle bar steering device for a motorcycle having a steering column with angular bearings to permit swing steering, a head pipe and friction means between said head pipe and steering column to provide turning friction resistance for the latter, said bearings comprising angular ball bearings having a swing angle of at least 50°, and being retained out of contact with one another by a retainer element, and said friction means comprising upper and lower friction rings respectively fitted into the upper and lower ends of said head pipe and onto said steering column, to permit reduction of axial pressure on said ball bearings, said upper friction ring being provided with an annular spring at its interior, said spring generating friction as it is tightened.

6. A device according to claim 5, wherein said ball bearings comprise a maximum of fourteen balls retained in an annular arrangement by pressure fitting of said retainer element.

7. A device according to claim 5, comprising upper and lower angular ball bearings, said upper ball bearings being affixed to a threaded upper portion of said steering column by means of a first nut, tightening of said first nut producing a substantially equal pressure on both said upper and said lower ball bearings.

8. A device according to claim 7, including a second nut threaded upon said threaded upper portion of said steering column, a lock washer being provided between said first and second nuts.

* * * * *